United States Patent
Schaude (10) Patent No.: US 10,956,398 B2
(45) Date of Patent: Mar. 23, 2021

(54) ENHANCED ALIAS MECHANISM

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 16/195,994

(22) Filed: Nov. 20, 2018

(65) Prior Publication Data

US 2020/0159844 A1     May 21, 2020

(51) Int. Cl.
  *G06F 16/23*     (2019.01)
(52) U.S. Cl.
  CPC ...... *G06F 16/2329* (2019.01); *G06F 16/2365* (2019.01)
(58) Field of Classification Search
  CPC .................. G06F 16/2329; G06F 16/2365
  USPC .......................................... 707/687
  See application file for complete search history.

(56) References Cited

U.S. PATENT DOCUMENTS

| | | | | |
|---|---|---|---|---|
| 8,706,772 B2* | 4/2014 | Hartig | ............... | G06F 21/52 370/395.53 |
| 9,110,899 B2* | 8/2015 | Cotner | ............... | G06F 16/256 |
| 2012/0041988 A1* | 2/2012 | Driesen | ............... | G06F 16/213 707/803 |
| 2012/0174081 A1* | 7/2012 | Thimmel | ............... | G06Q 30/0609 717/137 |
| 2013/0238545 A1* | 9/2013 | Fuchs | ............... | G06N 5/046 706/47 |
| 2014/0172775 A1* | 6/2014 | Niehoff | ............... | G06F 16/211 707/600 |
| 2018/0278675 A1* | 9/2018 | Thayer | ............... | G06F 9/46 |
| 2019/0391879 A1* | 12/2019 | Jarvie | ............... | G06F 16/2358 |

* cited by examiner

*Primary Examiner* — Michael Pham
(74) *Attorney, Agent, or Firm* — Mintz, Levin, Cohn, Ferris, Glovsky and Popeo, P.C.

(57) ABSTRACT

An identifier associated with a first tenant and an object for deployment into the first tenant is received. The first tenant forms part of a multitenant database system including the first tenant and a second tenant. The application includes objects in a first name space. The object is for use by an application forming part of the multitenant database system. A second namespace unique to the first tenant is determined using the identifier of the first tenant. An object in the second namespace is generated corresponding to the object in the first namespace. The generating includes mapping the object in the first namespace to the second namespace. The object is deployed in the second namespace to the first tenant. The deploying includes persisting the object in the second namespace to a tenant system forming part of the multitenant database system. Related apparatus, systems, techniques and articles are also described.

16 Claims, 3 Drawing Sheets

FIG. 3

ENHANCED ALIAS MECHANISM

TECHNICAL FIELD

The subject matter described herein relates to an enhanced alias mechanism for objects in a multi-tenant database system.

BACKGROUND

Businesses use a plurality of process applications and/or services in their business operations. Applications and/or services can be programs that an end-user runs to accomplish certain tasks and can work in conjunction with one or more back-end systems, which can store the data to be worked on, such as, for example, objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, and the like that may manipulate data in different ways to achieve results desired by the user.

Users can design and/or create various process objects, such as sales orders, invoices, and the like. An object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany. Objects can be created at design-time for execution at runtime of an application. To accommodate design-time creation and runtime execution, objects need to be deployed at the database. Deployment of objects can be a complicated process and can involve a multitude of aspects, such as version control, lifecycle management, special programs, application layer artifacts, and others.

In multi-tenant database systems, some objects can be visible system-wide (e.g., to all tenants). Where there is a desire to deploy a new or modified object within the system for a particular tenant, extensive testing of objects for each tenant during the development phase may be required. Absent extensive testing, there can be a risk of unintended consequences for other tenants sharing the multi-tenant database system. This can significantly hinder efficient implementation of multi-tenant database systems, management of objects among tenants, and the like.

SUMMARY

In an aspect, an identifier associated with a first tenant and an object for deployment into the first tenant is received. The first tenant forms part of a multitenant database system including the first tenant and a second tenant. The application includes objects in a first name space. The object is for use by an application forming part of the multitenant database system. A second namespace unique to the first tenant is determined using the identifier of the first tenant. An object in the second namespace is generated corresponding to the object in the first namespace. The generating includes mapping the object in the first namespace to the second namespace. The object is deployed in the second namespace to the first tenant. The deploying includes persisting the object in the second namespace to a tenant system forming part of the multitenant database system.

One or more of the following features can be included in any feasible combination. For example, the determining can be performed according to a function specific to the first tenant. The function specific to the first tenant can include a hash function utilizing the identifier of the first tenant. A second identifier can be received and associated with the second tenant. A third namespace unique to the second tenant can be determined using the second identifier. An object in the third namespace corresponding to the object in the first namespace can be generated. The generating can include mapping the object in the first namespace to the third namespace according to a second function that is specific to the second tenant. The object in the third namespace can be deployed to the second tenant. The deploying can include persisting the object in the second namespace to a second tenant system forming part of the multi-tenant database system. The first namespace can include a development namespace, a design namespace, and/or a test namespace. The object in the first namespace can include a data source, a field within the data source, a node, an element of the node, an association between two nodes, a table, and/or a web service.

A second identifier associated with the second tenant and a second application being a different version of the application can be received. A third namespace unique to the second tenant can be determined using the second identifier. An object in the third namespace corresponding to the object in the first namespace can be generated. The generating can include mapping the object from the first namespace to the third namespace according to a second function that is specific to the second tenant. The second application and the object in the third namespace can be deployed to the second tenant. The deploying can include persisting the object in the third namespace to a second tenant system forming part of the multi-tenant database system.

The first tenant and the second tenant can include different versions of the application. The application can include functions from a software development kit including predefined application functions. At least one of the receiving, the determining, the generating and the deploying can be performed by at least one data processor forming part of at least one computing system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

In some implementations, the current subject matter relates to an enhanced alias mechanism for deploying new or modified objects within a multi-tenant database system such that, for each tenant, each object is provided with a tenant-specific namespace. By deploying objects with tenant specific namespaces, some implementations of the current subject matter can enable improved control over multi-tenant database systems; avoid collision of objects across the system; enable deployment of different versions of objects and/or applications among different tenants; enable efficient development and testing of new or modified objects during the development phase; and avoid unintended consequences for other tenants sharing the multi-tenant database system.

In some multi-tenant systems, Partner Development Infrastructure (PDI) can be provided to enhance a cloud solution (e.g., application) of a tenant by creating PDI solutions that contain developed and enhanced objects. Such objects can be visible system-wide. A PDI can include a software development kit (SDK) and defined objects providing tools from which partners (e.g., tenants) can create custom solutions for enhancing their database systems. A SDK can include a library of predefined functions enabling a tenant to develop custom solutions. An object can include a data source, a field within the data source, a node, an element of the node, an association between two nodes, a table, a web service, a sales order, an invoice, and the like. An object can be created using any known computing systems and languages such as ABAP. Objects can be created at design-time for execution at runtime of an application. To accommodate design-time creation and runtime execution, objects are deployed at the database system.

Within some conventional multi-tenant database systems, these objects can be identified by a solution-specific name and a solution-specific prefix. This prefix can be referred to as a namespace. This namespace can be used to ensure that there are no clashes with objects provided by the database management provider. Furthermore, it is possible that several PDI solutions from different development partners (not necessarily deployed on the same tenant, but on the same system) can define objects, which can be identically named in these solutions. In these instances, the solution-specific prefix/namespace can be used to differentiate and identify uniquely each object.

If an error needs to be corrected or a new requirement needs to be developed, a new version (e.g., a patch) for the PDI solution can be created. This patch can contain all previous, new, and corrected objects, which can share the same solution-specific prefix/namespace. As these objects are visible system-wide, any changes affect all tenants within the system. This requires a separate development system and/or test system from the production system. This leads to a higher cost for the system provider as well as for the tenant.

Furthermore, using solution specific namespaces, a patch can only be deployed into a system in which this PDI solution is not available or only available in a lower version. Any tenant operations like tenant copy or tenant move also obeys this requirement.

Some implementations of the current subject matter relates to an enhanced alias mechanism for deploying new or modified objects within a multi-tenant database system such that, for each tenant, each object is provided with a tenant-specific namespace rather than only a solution-specific namespace. In some implementations, the new or modified object namespace (e.g., a patch namespace) can belong to the same solution, be different than the original namespace, can only be used for patches in further developments and corrections, and can be used in any deployed the original namespace is used. Such an approach can enable usage of the same system with different tenants. Moreover, in some implementations, tenant specific namespace can enable the object to reside on the tenant for development and on other systems for testing, which can reduce total cost of ownership.

Figure 1:
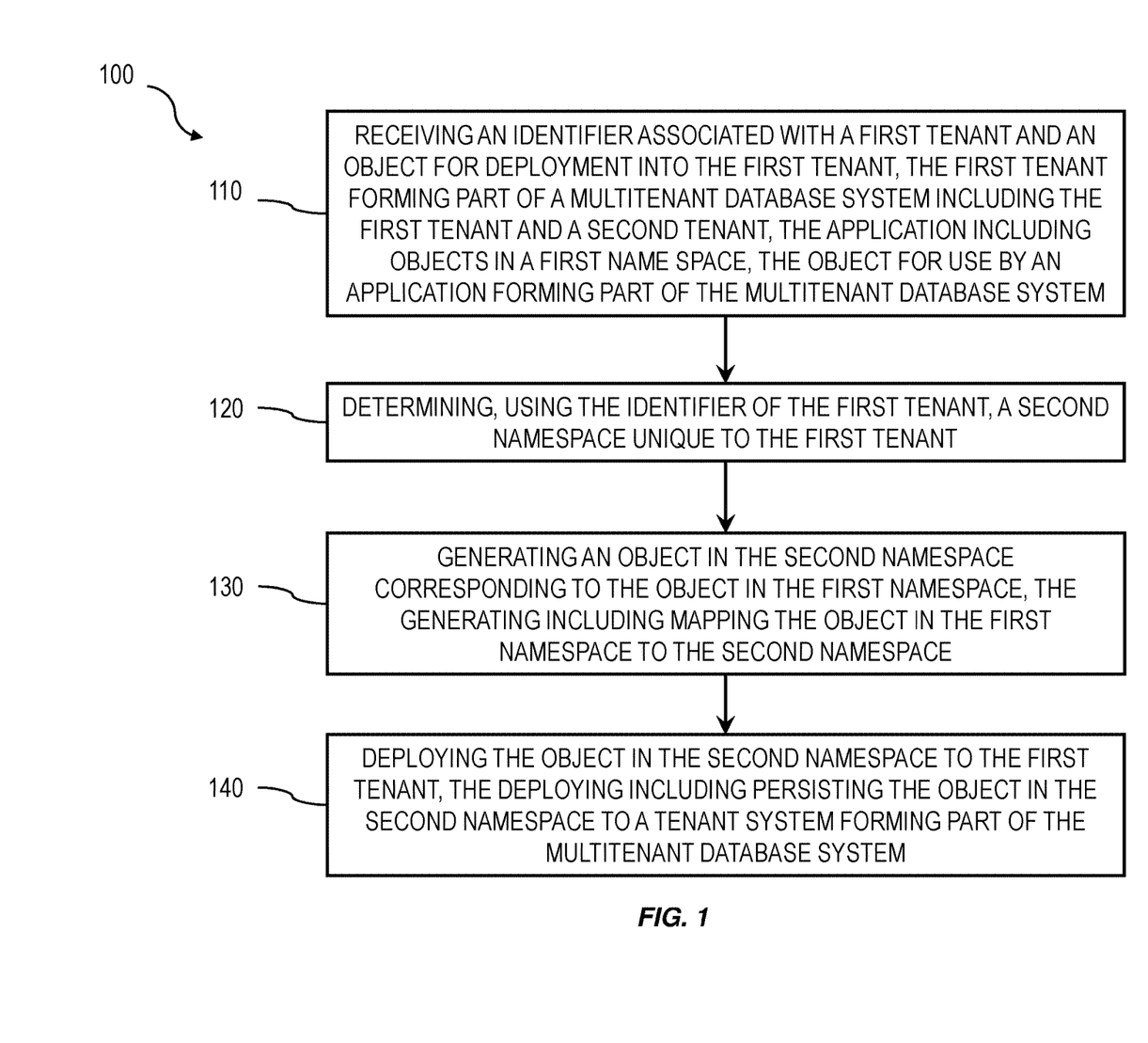
FIG. 1 is a process flow diagram illustrating an example process for deploying new or modified objects within a multi-tenant database system and using tenant-specific namespaces.

FIG. 1 is a process flow diagram illustrating an example process 100 for deploying new or modified objects within a multi-tenant database system and using tenant-specific namespaces. The multitenant database system can include a multi-cloud system, which can include the use of multiple cloud computing and storage services in a single heterogeneous architecture. Such an approach can include distributing cloud assets, software, applications, and the like, across several cloud-hosting environments. With a multicloud architecture utilizing two or more clouds, a multicloud environment can eliminate reliance on any single cloud provider.

For example, an enterprise may concurrently use separate cloud providers for infrastructure (IaaS) and software (SaaS) services, or use multiple infrastructure (IaaS) providers. In the latter case, they can use different infrastructure providers for different workloads, deploy a single workload load balanced across multiple providers (active-active), or deploy a single workload on one provider, with a backup on another (active-passive).

At 110, an identifier associated with a first tenant and an object for deployment into the first tenant can be received. The identifier and the object can be received by a multitenant database system, which can include system level processing and persistence. The multitenant database system can include multiple tenants including the first tenant. For example, the multitenant database system can include distributed database systems, enterprise resource planning ("ERP") systems, and customer relationship management ("CRM") systems. The identifier can include a unique tenant identifier, such as an identifier utilized by the multitenant database system to uniquely identify the tenant. A tenant can include a group of users who share a common access with specific privileges to the software instance of the system. With a multitenant architecture, a software application can be designed to provide every tenant a dedicated share of the instance, including its data, configuration, user management, tenant individual functionality and non-functional properties.

The object, having been created at design time, can exist within one or more first namespaces, for example, a development namespace, a design namespace, and/or a test namespace. The object can be received, for example, from a development system and by a production system. In addition, the object can be for use by an application (e.g., PDI) forming part of the multitenant database system. The object in the first namespace can include a data source, a field within the data source, a node, an element of the node, an association between two nodes, a table, a web service, a sales orders, invoices, and the like.

The application can include, for example, a solution including (e.g., comprised of) a software development kit such as a PDI.

At 120, a tenant namespace unique to the first tenant can be determined using the identifier of the first tenant. The tenant namespace can include, for example, a prefix or file path that is unique within the multi-tenant database system to the first tenant. Such a unique namespace can be determined, for example, by implementing a function specific to the first tenant such as using the first tenant's identifier within a hash function to determine a unique prefix. In some implementations, an input to the has function can include a suffix "PATCH". Other functions are possible.

At 130, an object in the tenant namespace corresponding to the object in the first namespace can be generated. The generating can including mapping the object in the first namespace to the tenant namespace. For example, the mapping can include instantiating a new object within the tenant namespace, moving the object in the first namespace to the tenant namespace, and the like.

At 140, the object in the tenant namespace can be deployed to the first tenant. Deploying can include persisting the object in the tenant namespace to a tenant system forming part of the multitenant database system. In addition, deployment of objects can include version control, lifecycle management, special programs, application layer artifacts, and the like.

Similarly, a second tenant can be provided with objects within a respective tenant-specific namespace. For example, a second identifier associated with the second tenant can be received. Using the second identifier, a namespace unique to the second tenant can be determined. An object in the namespace corresponding to the object in the first namespace can be generated. The generating including mapping the object in the first namespace to the namespace according to a second function that is specific to the second tenant. The object in the namespace can be deployed to the second tenant including persisting the object in the tenant namespace to a second tenant system forming part of the multi-tenant database system.

Using the current subject matter, new or modified objects and/or PDI solutions (e.g., applications) can be deployed such that tenants can include different versions of the objects and/or solutions. For example, the first tenant and the second tenant include different versions of the application. A second identifier associated with the second tenant and a second application being a different version of the application can be received by the multi-tenant database system and from a development system. Using the second identifier, a third namespace unique to the second tenant can be determined. An object in the third namespace corresponding to the object in the first namespace can be generated. The generating can include mapping the object from the first namespace to the third namespace according to another (e.g., second) function that is specific to the second tenant. The second application and the object in the third namespace can be deployed to the second tenant, which can result in different versions of solutions and/or objects existing at the same time on different tenants.

Figure 2:
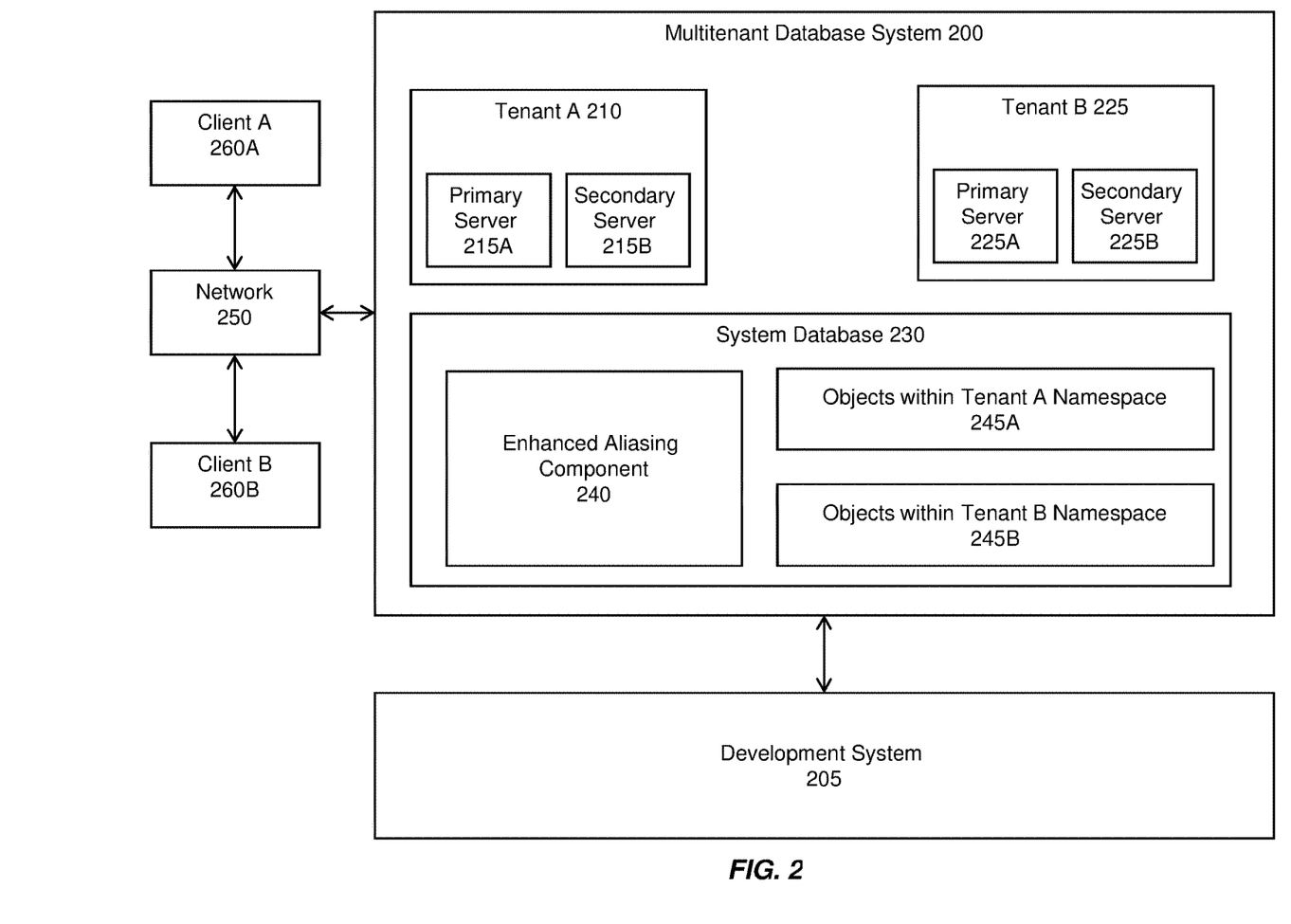
FIG. 2 depicts a system diagram illustrating a multitenant database system for deploying new or modified objects within a multi-tenant database system such that, for each tenant, each object is provided with a tenant-specific namespace.

FIG. 2 depicts a system diagram illustrating a multitenant database system 200 for deploying new or modified objects within a multi-tenant database system such that, for each tenant, each object is provided with a tenant-specific namespace. Referring to FIG. 2, the multitenant database 200 may include a plurality of tenant databases including, for example, a first tenant database 210 and a second tenant database 220. The multitenant database 200 may further include a system database 230 configured to orchestrate an enhanced aliasing mechanism enabling objects to exist in tenant-specific namespaces within the multitenant database 200. It should be appreciated that a given object can be deployed to some but not all tenant databases within the multitenant database system 200.

Each tenant database in a multitenant database system may run its own instances of a primary server and a secondary server, which may be executables from a kernel of the multitenant database system. To further illustrate, as shown in FIG. 2, the first tenant database 210 may include a first primary server 215A and a first secondary server 215B. The first primary server 215A and the first secondary server 215B may be running instances of executables from the kernel of the multitenant database system 200. Meanwhile, the second tenant database 220 may include a second primary server 225A and a second secondary server 225B. The second primary server 225A and the second secondary server 225B may also be running instances of executables from the kernel of the multitenant database system 200. It should be appreciated that each tenant database may be associated with more than one instance of a primary server and/or secondary server. Where a tenant database includes multiple primary servers, at least one the primary servers may be designated as a master primary server. The master primary server can coordinate with the system database 230 for deploying new or modified objects within a multi-tenant database system such that, for a tenant, each object is provided with a tenant-specific namespace rather than only a solution-specific namespace.

In some example embodiments, the system database 230 may be configured to orchestrate deployment of objects within tenant-specific namespaces. The system database 230 can receive objects from a development system 205, which can include a test system. The received objects can exist in a development and/or test namespace, which can be specific to the development system 205. The system database 230 can also receive an indication of the tenant for which associated objects are to be deployed. For example, the indication of the tenant can include a tenant system identifier that uniquely identifies a tenant system within multitenant database system 200. Objects can be received for multiple tenants.

The system database 230 can include an enhanced alias component 240 that can receive the objects from development system 205 and determine an appropriate tenant-specific namespace. Such a determination can include executing a function, such as a hash function, using the tenant's unique identification so that the tenant-specific namespace is unique across the multitenant database system 200, which can avoid collisions between tenants. In some implementations, multiple tenant-specific namespaces can be determined.

The enhanced alias component 240 can generate objects in the tenant specific namespace that correspond to the received objects, which are in the development system 205 namespace. The generating can including mapping the object in the development and test namespace to the tenant-specific namespace. For example, the mapping can include instantiating a new object within the tenant-specific namespace, moving the object to the tenant-specific namespace, and the like. The system database 230 can include persistency locations 245A, 245B for storing the generated objects prior to deployment within the first tenant database 210 and second tenant database 220.

The system database 230 can orchestrate deployment of the objects within the tenant-specific namespace to their respective tenants. Deploying can include persisting the objects in the tenant-specific namespace to the appropriate tenant system. For example, an object stored in persistency 245 can be deployed to tenant database 210 including persisting the object in the tenant-specific namespace to the primary server 215A. In addition, deployment of objects can include version control, lifecycle management, special programs, application layer artifacts, and the like. Corresponding solutions (e.g., applications) can similarly be managed and deployed.

Once objects have been deployed, the multitenant database system 200 may operate utilizing the objects within the tenant-specific namespaces. For instance, the tenant database 210 may access the objects located within primary server 215A, in response to a database query that requires running one or more application functions (e.g., PDI functions). To further illustrate, the first tenant database 210 may receive, from a first client 260A associated with the first tenant database 210 and via network 250, a database query. The first primary server 215A may process the database query including using the objects within the tenant-specific namespace and located within tenant system 210 that are required to execute the database query.

Alternatively and/or additionally, the second tenant database 220 may receive a database query from a second client 260B associated with the second tenant database 220 and via network 250. The second primary server 225A may process this database query including using the objects within the tenant-specific namespace and located within tenant system 220 that are required to execute the database query.

Figure 3:
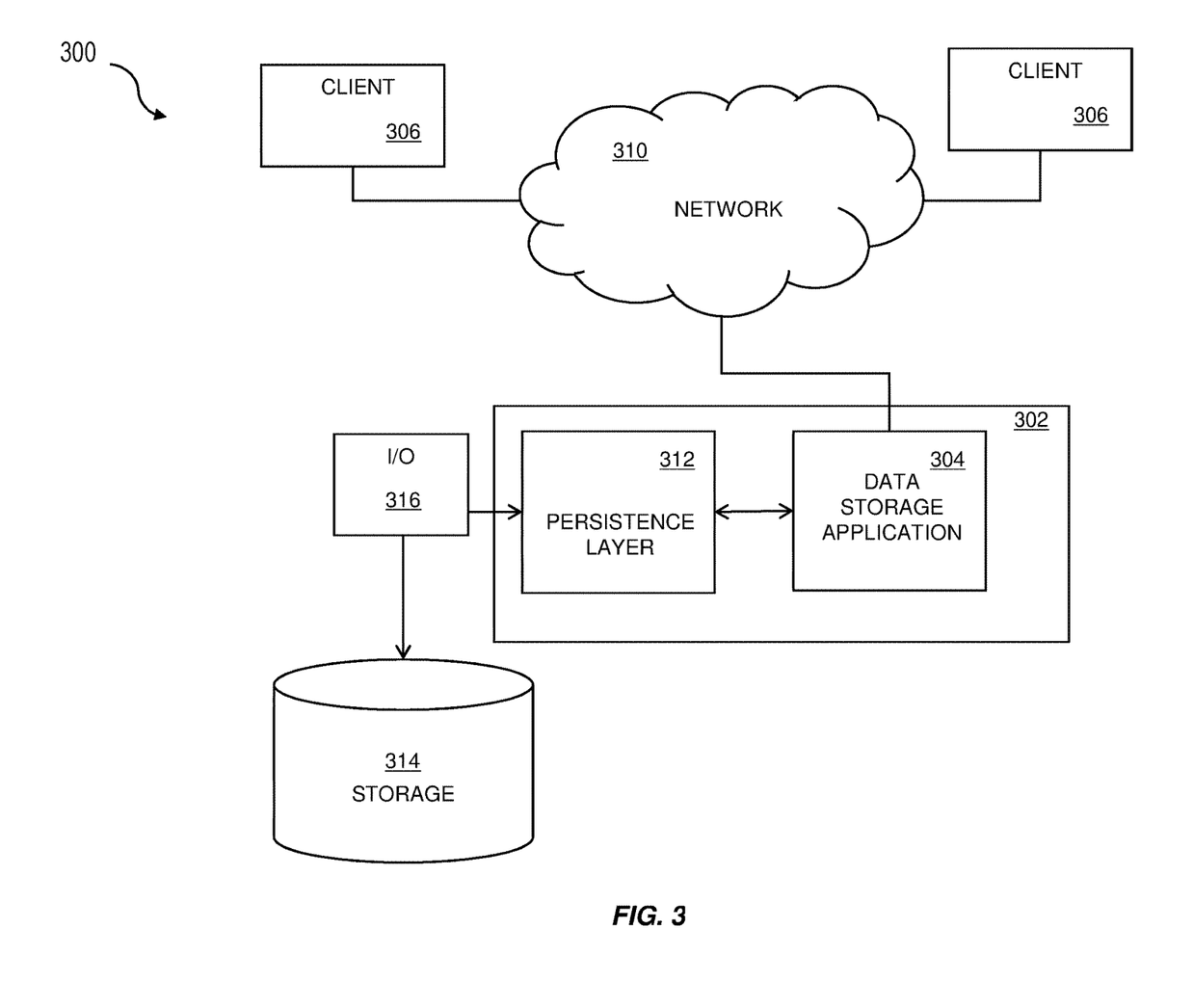
FIG. 3 illustrates an exemplary system according to some implementations of the current subject matter.

FIG. 3 illustrates an exemplary system 300 in which a computing system 302, which can include one or more programmable processors that can be collocated, linked over one or more networks, and the like, executes one or more modules, software components, or the like of a data storage application 304, according to some implementations of the current subject matter. The data storage application 304 can include one or more of a database, an enterprise resource program, a distributed storage system, or the like.

The one or more modules, software components, or the like can be accessible to local users of the computing system 302 as well as to remote users accessing the computing system 302 from one or more client machines 306 over a network connection 310. One or more user interface screens produced by the one or more first modules can be displayed to a user, either via a local display or via a display associated with one of the client machines 306. Data units of the data storage application 304 can be transiently stored in a persistence layer 312 (e.g., a page buffer or other type of temporary persistency layer), which can write the data, in the form of storage pages, to one or more storages 314, for example via an input/output component 316. The one or more storages 314 can include one or more physical storage media or devices (e.g. hard disk drives, persistent flash memory, random access memory, optical media, magnetic media, and the like) configured for writing data for longer term storage. It should be noted that the storage 314 and the input/output component 316 can be included in the computing system 302 despite their being shown as external to the computing system 302 in FIG. 3.

Data retained at the longer term storage 314 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Although a few variations have been described in detail above, other modifications or additions are possible. For example, namespaces can be both tenant-specific and solution-specific thereby resulting in one or more objects for each solution and each tenant in a multi-tenant database system. Namespaces can be solution-specific and can become tenant-specific for testing purposes. The patch (e.g., tenant) namespace can be assigned to development/correction process. The original namespace can be assigned to production to not disrupt current processes. Other implementations are possible.

Without in any way limiting the scope, interpretation, or application of the claims appearing below, a technical effect of one or more of the example implementations disclosed herein may include one or more of the following, for example, the current subject matter enables increased control over multitenant database systems by enabling tenant-specific objects for solutions that may be visible to all tenants in a multitenant database system. By enabling tenant-specific objects, updates to individual tenant systems can be achieved without requiring substantial testing and design resources for tenants that do not require the update but would nevertheless be affected by any update that is visible system wide. Some implementations of the current subject matter can enable deployment of the same solution in different versions into different tenants of the same system resulting in reduced total cost of ownership for both the tenant and the system provider. Furthermore some implementations can simplify object and solution management during administration of the multi-tenant system as well as the tenants because a check may no longer be needed for a tenant operation like tenant copy or tenant move. This can be because the PDI solutions in the source tenant may be already deployed into any tenant of the target system and in the appropriate version. Based on this check, the system can be determined to be applicable for a tenant operation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving an identifier associated with a first tenant and a first object for deployment into the first tenant, the first tenant forming part of a multitenant database system including the first tenant and a second tenant, the first object for use by an application forming part of the multitenant database system and the application including objects in a first namespace, the objects identified by at least a first prefix, the first namespace including the first prefix;
determining, using the identifier of the first tenant, a second namespace unique to the first tenant, the second namespace including a second prefix, wherein the second prefix is determined based on at least a function specific to the first tenant, wherein the function specific to the first tenant includes a hash function utilizing the identifier of the first tenant;
generating a second object in the second namespace corresponding to the first object in the first namespace, the generating including mapping the first object in the first namespace to the second namespace; and
deploying the second object in the second namespace to the first tenant, the deploying including persisting the second object in the second namespace to the multi-tenant database system, and at a location characterized by the second prefix.

2. The method of claim 1, further comprising:
receiving a second identifier associated with the second tenant;
determining, using the second identifier, a third namespace unique to the second tenant;
generating a third object in the third namespace corresponding to the first object in the first namespace, the generating including mapping the first object in the first namespace to the third namespace according to a second function that is specific to the second tenant; and
deploying the third object in the third namespace to the second tenant, the deploying including persisting the third object in the second namespace to the multi-tenant database system.

3. The method of claim 1, wherein the first namespace is a development namespace, a design namespace, and/or a test namespace.

4. The method of claim 1, wherein the first object in the first namespace includes a data source, a field within the data source, a node, an element of the node, an association between two nodes, a table, and/or a web service.

5. The method of claim 1, further comprising:
receiving a second identifier associated with the second tenant and a second application being a different version of the application;
determining, using the second identifier, a third namespace unique to the second tenant;
generating a third object in the third namespace corresponding to the first object in the first namespace, the generating including mapping the first object from the first namespace to the third namespace according to a second function that is specific to the second tenant; and
deploying the second application and the third object in the third namespace to the second tenant, the deploying including persisting the third object in the third namespace to the multi-tenant database system.

6. The method of claim 1, wherein the first tenant and the second tenant include different versions of the application.

7. The method of claim 1, wherein the application includes functions from a software development kit including predefined application functions.

8. The method of claim 1, wherein at least one of the receiving, the determining, the generating and the deploying are performed by at least one data processor forming part of at least one computing system.

9. A system comprising:
at least one processor;
memory storing instructions which, when executed by the at least one processor, causes the at least one processor to perform operations comprising:
receiving an identifier associated with a first tenant and [[an]] a first object for deployment into the first tenant, the first tenant forming part of a multitenant database system including the first tenant and a second tenant, the first object for use by an application forming part of the multitenant database system and the application including objects in a first namespace, the objects identified by at least a first prefix, the first namespace including the first prefix;
determining, using the identifier of the first tenant, a second namespace unique to the first tenant, the second namespace including a second prefix, wherein the second prefix is determined based on at least a function specific to the first tenant, wherein the function specific to the first tenant includes a hash function utilizing the identifier of the first tenant;
generating a second object in the second namespace corresponding to the first object in the first namespace, the generating including mapping the first object in the first namespace to the second namespace; and
deploying the second object in the second namespace to the first tenant, the deploying including persisting the second object in the second namespace to the multi-tenant database system, and at a location characterized by the second prefix.

10. The system of claim 9, the operations further comprising:
receiving a second identifier associated with the second tenant;
determining, using the second identifier, a third namespace unique to the second tenant;
generating a third object in the third namespace corresponding to the first object in the first namespace, the generating including mapping the first object in the first namespace to the third namespace according to a second function that is specific to the second tenant; and
deploying the third object in the third namespace to the second tenant, the deploying including persisting the third object in the second namespace to the multi-tenant database system.

11. The system of claim 9, wherein the first namespace is a development namespace, a design namespace, and/or a test namespace.

12. The system of claim 9, wherein the first object in the first namespace includes a data source, a field within the data source, a node, an element of the node, an association between two nodes, a table, and/or a web service.

13. The system of claim 9, the operations further comprising:
receiving a second identifier associated with the second tenant and a second application being a different version of the application;
determining, using the second identifier, a third namespace unique to the second tenant;
generating a third object in the third namespace corresponding to the first object in the first namespace, the generating including mapping the first object from the first namespace to the third namespace according to a second function that is specific to the second tenant; and
deploying the second application and the third object in the third namespace to the second tenant, the deploying including persisting the third object in the third namespace to the multi-tenant database system.

14. The system of claim 9, wherein the first tenant and the second tenant include different versions of the application.

15. The system of claim 9, wherein the application includes functions from a software development kit including predefined application functions.

16. A non-transitory computer readable medium storing instructions, which when executed by at least one processor of at least one computing system, implement operations comprising:
receiving an identifier associated with a first tenant and a first object for deployment into the first tenant, the first tenant forming part of a multitenant database system including the first tenant and a second tenant, the first object for use by an application forming part of the multitenant database system and the application including objects in a first namespace, the objects identified by at least a first prefix, the first namespace including the first prefix;
determining, using the identifier of the first tenant, a second namespace unique to the first tenant, the second namespace including a second prefix, wherein the second prefix is determined based on at least a function specific to the first tenant, wherein the function specific to the first tenant includes a hash function utilizing the identifier of the first tenant;
generating a second object in the second namespace corresponding to the first object in the first namespace, the generating including mapping the first object in the first namespace to the second namespace; and
deploying the second object in the second namespace to the first tenant, the deploying including persisting the second object in the second namespace to the multi-tenant database system, and at a location characterized by the second prefix.

* * * * *